Jan. 3, 1950 — T. W. BOHMKER ET AL — 2,492,962
BEET HARVESTER
Filed March 31, 1947 — 2 Sheets-Sheet 1
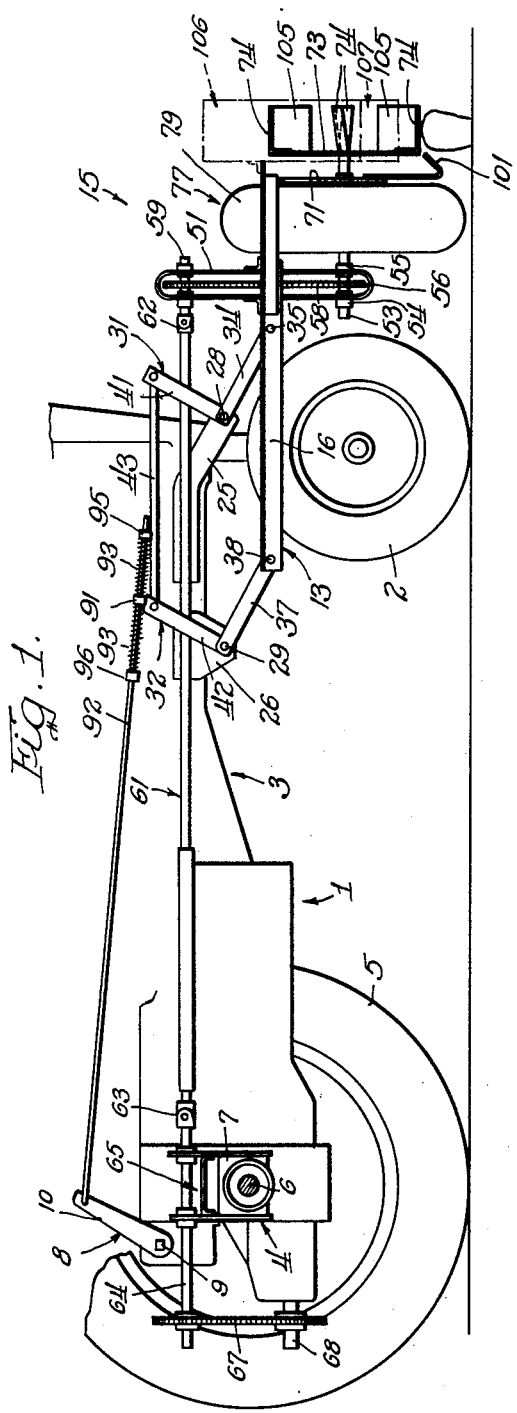
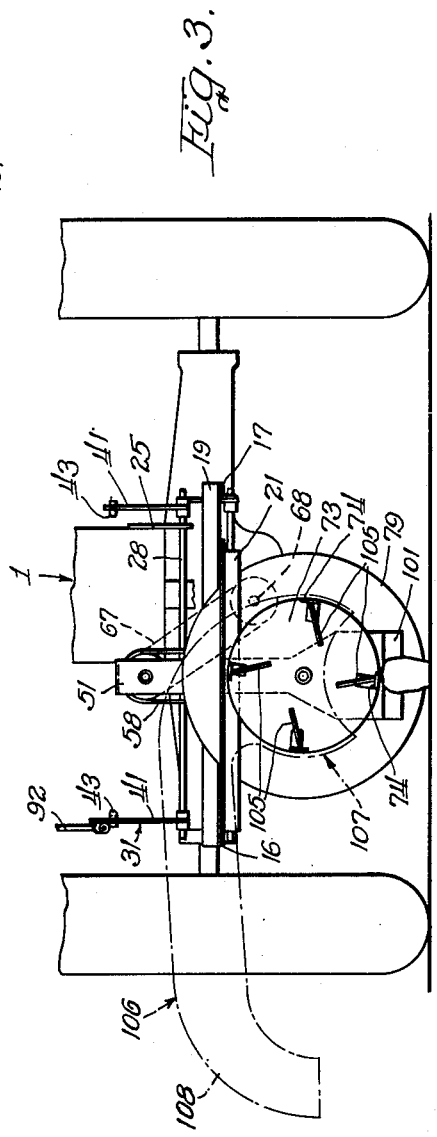
Inventors:
Thomas W. Bohmker,
Claude W. Walz,
James H. Clark.
By their Attorneys Jan. 3, 1950  T. W. BOHMKER ET AL  2,492,962
BEET HARVESTER
Filed March 31, 1947  2 Sheets-Sheet 2
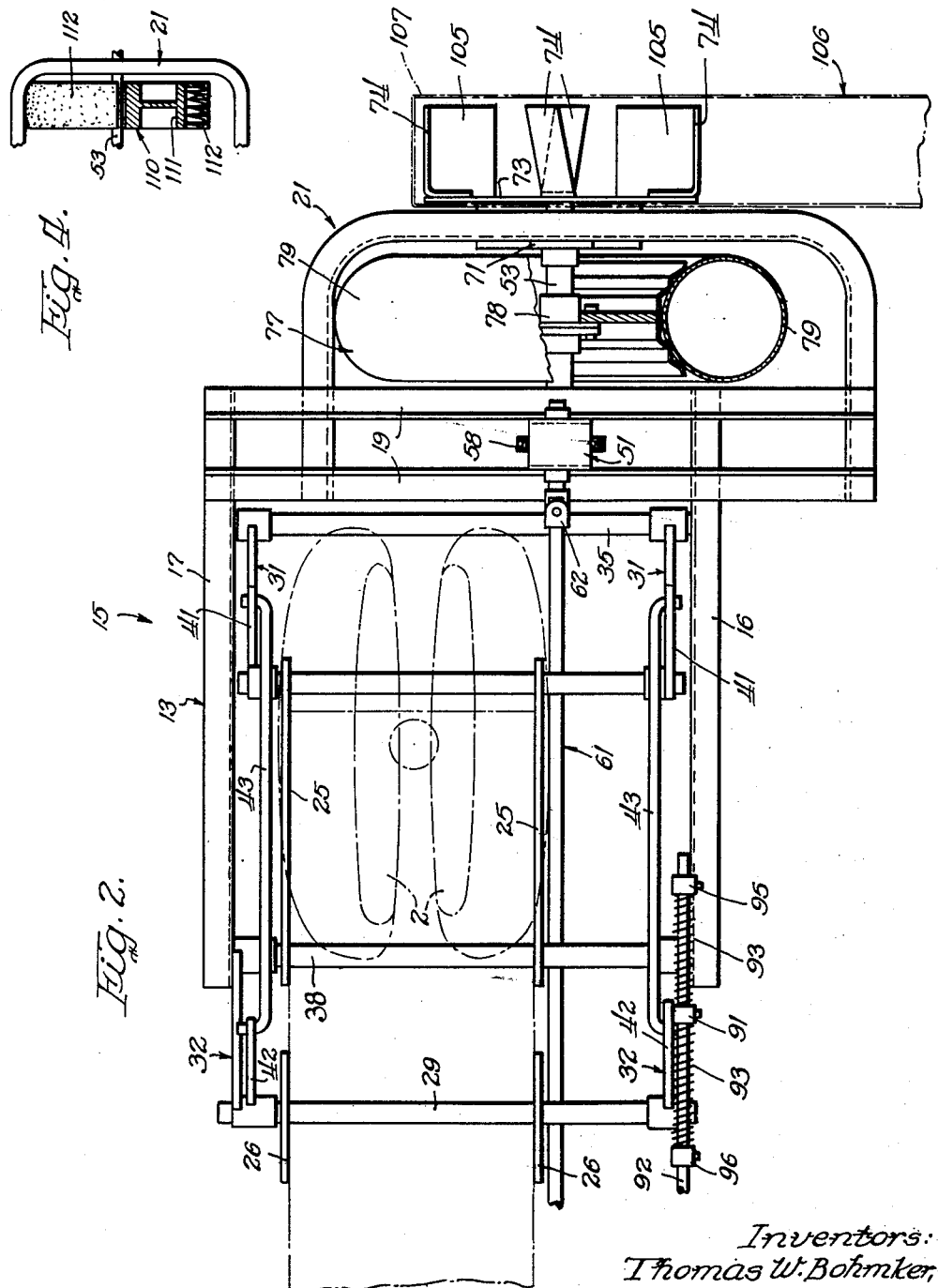
Inventors:
Thomas W. Bohmker,
Claude W. Walz,
James H. Clark.

Patented Jan. 3, 1950

2,492,962

UNITED STATES PATENT OFFICE 2,492,962

BEET HARVESTER

Thomas W. Bohmker, Geneseo, Claude W. Walz, Rock Island, and James H. Clark, Moline, Ill., assignors to Deere & Company, Moline, Ill., a corporation of Illinois Application March 31, 1947, Serial No. 738,356

9 Claims. (Cl. 56—121.44)

The present invention relates generally to agricultural implements and more particularly to machines for harvesting sugar beets and the like.

The object and general nature of the present invention is the provision of a new and improved sugar beet harvester which includes means for shredding the major portions of the tops of the beets and, acting in cooperation therewith, means for abrading or polishing the crowns of the beets while they are still in the ground in order to remove the leaf stubs, leaf scar and the like by a scrubbing, polishing or abrading action, but without cutting away any appreciable quantity of the sugar bearing portions of the beet crowns. The beets subsequently are lifted from the ground by a separate machine.

More specifically, it is a feature of the present invention to provide a new and improved beet crown polishing unit in the form of a rotary abrading wheel having a tire-like peripheral section, preferably inflatable but to a low degree whereby, in view of such low pressure, the abrading unit may be forced downwardly to an extent sufficient to cause the peripheral portions of the abrading surface to substantially entirely embrace the beet crowns so as to remove all leaf scar, leaf stubs and the like by the rotation of the abrading wheel while the outfit travels down a beet row.

A further feature of this invention is the provision of a combined top shredding and crown abrading unit, preferably in the form of a rotary member carrying forwardly extending knives and an inflatable or pneumatic abrading unit, both mounted for rotation on the same shaft and preferably driven from the power take-off of the tractor.

These and other objects advantages of the present invention will be apparent to those skilled in the art after a consideration of the following detailed description, taken in conjunction with the accompanying drawings, in which:

Figure 1 is a side view of a beet harvester in which the principles of the present invention have been incorporated.

Figure 2 is a plan view and Figure 3 a rear view of the machine shown in Figure 1.

Figure 4 is a side view of a modified form of a beet crown abrading and polishing unit.

Referring now to the drawings, particularly Figures 1-3, the beet harvester of the present invention is shown as mounted on a tractor I of more or less conventional construction, embodying front steerable wheels 2, a narrow elongated supporting frame 3, and a rear axle structure 4, which includes rear wheels 5 mounted on axle shafts 6 journaled for rotation in lateral extensions 7 that form a part of the rear axle structure 4. The tractor I preferably is equipped with a power lift unit 8 having a power rockshaft 9 and a lift arm 10.

The top shredding and beet crown abrading unit is indicated in its entirety by the reference numeral 15 and includes a frame 13 made up of a pair of longitudinally extending angles 16 and 17, the forward ends of which are connected together by transverse angles 19, which extend outwardly toward the right and which form a support for a forwardly extending U-shaped frame member 21. The tractor I carries a forward pair of attaching brackets 25 and a rear pair of attaching brackets 26 which preferably are bolted to the sides of the tractor frame 3, and these brackets are apertured to receive and support a pair of spaced apart rockshafts 28 and 29. The cross shafts 28 and 29 support pairs of bell crank members 31 and 32. The bell crank members 31 include downwardly and forwardly extending arm sections 34 which at their lower ends are apertured and receive a forward cross shaft 35 that supports the forward portion of the vertical shiftable frame 13. The rear bell cranks 32 have downwardly and forwardly extending arms 37 which are apertured to receive a cross shaft 38 which supports the rear ends of the frame bars 16 and 17. The forward bell cranks 31 also include upwardly extending arms 41 and the rear bell cranks 32 also include upwardly extending arms 42, these arms being apertured and connected together by links 43, whereby rocking the two pairs of bell cranks 31 and 32 results in raising and lowering the frame 13 into different parallel positions. The means for raising and lowering the frame 13 will be referred to below.

The frame 13 supports a double standard 51, preferably formed of two U-shaped strap sections welded, riveted, or otherwise rigidly fixed at their central portion to the generally central portions of the front transverse frame angles 19. In the lower end of the standard 51 is the rear portion of a generally longitudinally extending shaft 53, supported therein by suitable bearing means 54 and 55. Between the two bearing 54 and 55 a sprocket 56 is fixed to the shaft 53 and receives a driving sprocket chain 58, the upper portion of which is trained over a sprocket fixed to a stub shaft 59 journaled in suitable bearings in the upper end of the double standard 51. The stub shaft 59 is connected to a telescopic shaft means 61 and associated universal joints 62 and 63 with a short shaft 64 which is carried in a bracket 65 fixed to the rear axle 4. The shaft 64 is driven by a pulley or driving chain 67 from the power take-off shaft 68.

The forward end of the shaft 53 is supported for rotation in the lower portion of a vertical bracket 71 which is fixed to and depends from the U-shaped frame member 21. The shaft 53 extends forwardly beyond the bearing bracket 71 and carries a disk 73 on which a plurality of top shredding knives 74 are fixed. Preferably, the cutting portions of the knives 74 extend generally forwardly, substantially parallel to the axis of rotation of the knives. Also mounted on the shaft 53, between the brackets 51 and 71, is a beet crown abrading wheel indicated in its entirety by the reference numeral 77. Preferably, the beet crown abrading wheel 77 includes a hub portion 78 fixed in any suitable way to the shaft and a peripheral or beet crown engaging section 79, which may be in the form of a pneumatic tire, such as a new or used automobile tire. The wheel and tire are rotated concomitantly with the top shredding knives but, as best shown in Figure 1, the tire 79 extends radially outwardly of the knives so that after the latter have shredded the tops of the beets the tire is in a position to engage the beet crowns. The tire 79, being made of rubber or rubberlike material, is flexible yet has such friction characteristics that, when the unit is rotated, the tire rubs or scours the beet crowns so as to remove all leaf stubs, leaf scar and the like. Preferably, the tire carries only a low degree of inflation so that when the unit is in operation, the portions of the tire that engage the beet crown substantially embrace and contact all of the portions of the beet crowns when the abrading unit is lowered into operating position, the walls of the tire 79 flexing as they pass over the beet crowns.

The frame 16 is raised and lowered by means that is preferably connected with the power take-off unit 8 of the tractor. To this end, each of the upwardly extending arms 42 carries a swivel 91 through which the forward end of a raising and lowering rod 92 extends. A compression spring 93 is disposed on opposite sides of the swivel 91. The forward spring 93 bears against a set screw collar 95 and the rear spring 93 bears against a set screw collar 96. The rear end of the rod 92 is connected, as at 97, to the lower end of an arm extension 98, there being such an extension 98 at each end of the power lift rockshaft 9. The power lift unit 8 is of such construction that the rockshaft 9 may be moved into any one of several lowered positions and held in that position and it also may be raised into a raised or upper position, as desired. The springs 93 provide for a limited amount of up and down movement of the unit 15 relative to the tractor so as to accommodate variations in the position of the top shredding and beet crown abrading unit, as may occur when passing over high and low beets. In order to insure that the abrading unit will operate at the proper position, a finder or guide 101 is fixed to the lower end of the forward standard 71, between the knife unit and the abrading unit and is thus disposed in a position to engage the beet crowns and raise or lower the operating units accordingly. When the power lift rockshaft is swung into its raised position, the arms 41, 42 are rocked rearwardly, thus raising the operating unit into a transport position. At this time, if desired, the power take-off shaft clutch of the tractor may be shifted into a position disconnecting the drive to the power take-off shaft 68.

In order to provide for lateral disposition of the tops shredded by the knives 74, we provide a plurality of vanes 105 (Figure 3), fixing them in any suitable way to the disk 73, and surrounding the vanes 105 is a casing 106, shown in dotted lines, which is fixed in any suitable way to the frame 13 at its forward end and is provided with a top-receiving section 107 which surrounds the knives 74 and blades 105. The casing 106 also includes the discharge extension 108 which is provided so as to discharge the shredded tops laterally away from the path of movement of the tractor and harvester.

A modified form of beet crown abrading unit is shown in Figure 4. Referring now to this figure, the shaft 53 in this form of the invention is provided with a wheel 110 having a rim section 111 carrying brush bristles 112, which may be of any suitable material, such as wire, fibres or the like having the desirable wearing characteristics.

In operation, the tractor is driven along the beet row and the operating unit 15 lowered to such a position that the knives 74 will engage and shred the beet tops, leaving only short stubs of the leaves projecting from the beet crowns. The unit 15 is free to move upwardly or downwardly, as guided by the passage of the finder 101 over the beets. The tops shredded by the knives 94 are drawn by the rotation of the blades 105 into the casing 106 and discharged laterally outwardly through the discharge extension 108 thereof. The beet abrading wheel 77 is rotated at the same speed as the disk 73 and, referring to the wheel 77, the tire or pneumatic annulus thereof is inflated to a relatively low pressure so as to permit the walls of the tire to embrace and surround the upper portion or crown of each of the beets as the machine passes down a beet row, the rotation of the wheel serving to scrub or polish the crowns of the beets, removing all leaf stubs, leaf scar and the like therefrom but without taking away any appreciable portion of the sugar bearing section of the beet crown.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a beet harvester, a rotatable top removing device, a rotatable beet crown abrading device supported coaxially and rearwardly of said top removing device and including portions extending radially beyond the radially outer portions of said top removing device for removing leaf scar and the like from the beet crowns after the tops have been removed therefrom by said top removing device, and a beet engaging guide disposed between said axially spaced devices.

2. In a beet harvester, a beet crown abrading unit for removing superficial portions of the beet crowns, comprising a rotatable shaft, a wheel member fixed thereto, and a beet crown engaging rim portion carried by said wheel, said rim portion comprising an inflated annulus, means for rotating said wheel member, and means for pressing said wheel member downwardly with such force as to cause said annulus to at least partially embrace the crown of each beet as said wheel member passes thereover.

3. In a beet harvester, a mobile frame adapted to pass down a row of beets to be harvested, a wheel member supported by said frame in a position so that the rim portion of said wheel member engages the crowns of the beets, and means for rotating said wheel member, said rim portion comprising a pneumatic tire-like section inflated to a degree to give shape to said section but to yield as the section passes over a beet, whereby substantially the entire crown of the beet is abraded by the passage of said section thereover when the wheel member is rotated as it passes down the beet row.

4. In a beet harvester, a mobile frame adapted to pass down a row of beets to be harvested, a wheel member supported by said frame in a position so that the rim portion of said wheel member engages the crowns of the beets, means for rotating said wheel member, said rim portion comprising a flexible section having such friction characteristics as to remove the superficial portions of each beet crown when the wheel member is rotated while said frame passes along the row, and means for supporting said wheel member for rotation in a generally transverse vertical plane and substantially directly over the beet row.

5. In a beet harvester, a mobile frame adapted to pass down a row of beets to be harvested, a wheel member supported by said frame in a position so that the rim portion of said wheel member engages the crowns of the beets, means for rotating said wheel member, said rim portion comprising a flexible section having such friction characteristics as to remove the superficial portions of each beet crown when the wheel member is rotated while said frame passes along the row, means for supporting said wheel member for rotation in a generally transverse vertical plane at the forward end of said frame, and a plurality of knives rotatable with said wheel member and disposed ahead of said wheel member so as to remove leaves and the like from the beets in advance of said wheel member.

6. In a beet harvester, a mobile frame adapted to pass down a row of beets to be harvested, a wheel member supported by said frame in a position so that the rim portion of said wheel member engages the crowns of the beets, means for rotating said wheel member, said rim portion comprising a flexible section having such friction characteristics as to remove the superficial portions of each beet crown when the wheel member is rotated while said frame passes along the row, and means carried at the forward portion of said frame for removing leaves and the like from the beets in advance of said wheel member.

7. In a beet harvester including a mobile frame adapted to pass down a row of beets to be topped, a topping device comprising a member mounted on said frame for rotation about a fore and aft extending axis, a plurality of leaf-shredding knives carried by said member, and a beet crown abrading unit carried by said member rearwardly of said knives and including beet crown engaging means disposed in a position radially beyond said knives so as to act on said beet crown for removing leaf stubs, leaf scar and the like after said knives have removed at least the major portions of said leaves.

8. The invention set forth in claim 7, further characterized by a beet engaging finder connected with said abrading unit and said knives for raising and lowering said unit and knives so as to operate on beets of different height.

9. In a beet harvester adapted to be connected to a tractor having a power actuated member adjacent the rear thereof, frame means adapted to be swingably connected with the tractor, a beet crown abrading member rotatably mounted in said frame means and including a resilient flexible section of pneumatic tire-like construction, means for rotating said beet crown dressing member, and a connection between said frame means and said tractor power actuated member for pressing said frame means and said beet crown abrading member generally downwardly by the power of the tractor.

THOMAS W. BOHMKER.
CLAUDE W. WALZ.
JAMES H. CLARK.

REFERENCES CITED

The following references are of record in the file of this patent:

UNITED STATES PATENTS

| Number | Name | Date |
|---|---|---|
| 951,476 | King | Mar. 8, 1910 |
| 2,062,711 | Hansen | Dec. 1, 1936 |
| 2,250,948 | Garst | July 29, 1941 |
| 2,297,065 | McLendon | Sept. 29, 1942 |
| 2,354,112 | Garst | July 18, 1944 |
| 2,406,013 | Grew | Aug. 20, 1946 |
| 2,428,904 | Zuckerman | Oct. 14, 1947 |

FOREIGN PATENTS

| Number | Country | Date |
|---|---|---|
| 18,233 | Australia | 1924 |